United States Patent
Liu et al.

(10) Patent No.: US 11,080,890 B2
(45) Date of Patent: Aug. 3, 2021

(54) IMAGE SENSOR INITIALIZATION IN A ROBOTIC VEHICLE

(71) Applicant: QUALCOMM Incorporated, San Diego, CA (US)

(72) Inventors: Xiaohui Liu, Beijing (CN); Yibo Jiang, Shanghai (CN); Lei Xu, Beijing (CN); Jiangtao Ren, Xi'an (CN); Yanming Zou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/621,392

(22) PCT Filed: Jul. 28, 2017

(86) PCT No.: PCT/CN2017/094926
§ 371 (c)(1),
(2) Date: Dec. 11, 2019

(87) PCT Pub. No.: WO2019/019157
PCT Pub. Date: Jan. 31, 2019

(65) Prior Publication Data
US 2020/0167953 A1     May 28, 2020

(51) Int. Cl.
*G06T 7/73*  (2017.01)
*G06T 7/60*  (2017.01)
(Continued)

(52) U.S. Cl.
CPC ............. *G06T 7/74* (2017.01); *G05D 1/0094* (2013.01); *G05D 1/0251* (2013.01); *G06T 7/60* (2013.01);
(Continued)

(58) Field of Classification Search
CPC .......... H04N 5/232995; H04N 5/23222; G06T 7/74; G06T 7/60; G06T 2207/20016;
(Continued)

(56) References Cited

U.S. PATENT DOCUMENTS

| 1,070,535 A | * | 8/1913 | Roclawski ............. A47G 19/24 222/142.8 |
| 7,774,158 B2 | * | 8/2010 | Domingues Goncalves ............... G05D 1/024 702/152 |

(Continued)

FOREIGN PATENT DOCUMENTS

| CN | 104537709 A | 4/2015 |
| CN | 105783913 A | 7/2016 |

(Continued)

OTHER PUBLICATIONS

International Search Report and Written Opinion—PCT/CN2017/094926—ISA/EPO—dated Apr. 18, 2018, 9 pages.

*Primary Examiner* — Brian P Yenke
(74) *Attorney, Agent, or Firm* — The Marbury Law Group, PLLC

(57) ABSTRACT

Various embodiments include processing devices and methods for initializing an image sensor of a robotic vehicle. In some embodiments, a processor of the robotic vehicle may extract first features from a captured image of the target image, may extract second features from a predefined image pyramid of the target image, may match first features and second features, and may estimate an image sensor pose based on matched features and known dimensions of the target image. In some embodiments, the processor may estimate an image or to image sensor pose based on matched features and a translation and/or rotation of the robotic (Continued)

vehicle. In some embodiments, the processor may determine a coordinate system for the robotic vehicle based on one or more image sensor poses.

30 Claims, 9 Drawing Sheets

(51) Int. Cl.
*G05D 1/00* (2006.01)
*G05D 1/02* (2020.01)
*H04N 5/232* (2006.01)
*B60R 11/04* (2006.01)
*B60R 11/00* (2006.01)

(52) U.S. Cl.
CPC ..... *H04N 5/23222* (2013.01); *H04N 5/23299* (2018.08); *B60R 11/04* (2013.01); *B60R 2011/004* (2013.01); *G06T 2207/20016* (2013.01); *G06T 2207/30244* (2013.01); *G06T 2207/30252* (2013.01)

(58) Field of Classification Search
CPC G06T 2207/30244; G06T 2207/30252; G05D 1/0094; G05D 1/0251; B60R 11/04
See application file for complete search history.

(56) References Cited

U.S. PATENT DOCUMENTS

| | | | |
|---|---|---|---|
| 8,798,840 B2* | 8/2014 | Fong | G05D 1/0238 701/23 |
| 9,020,637 B2 | 4/2015 | Schnittman | |
| 9,037,396 B2* | 5/2015 | Pack | G01C 21/30 701/409 |
| 9,286,810 B2* | 3/2016 | Eade | G06F 16/24578 |
| 9,329,598 B2* | 5/2016 | Pack | G05D 1/0274 |
| 9,576,183 B2 | 2/2017 | Reitmayr et al. | |
| 9,630,319 B2* | 4/2017 | Vicenti | G05D 1/0272 |
| 9,667,873 B2 | 5/2017 | Mulloni et al. | |
| 9,946,264 B2* | 4/2018 | Liao | G05D 1/0253 |
| 9,964,955 B2* | 5/2018 | Keivan | G05D 1/0274 |
| 10,386,850 B2* | 8/2019 | Heinla | G06T 7/579 |
| 10,584,971 B1 | 3/2020 | Askeland | G01C 21/3676 |
| 10,778,967 B2* | 9/2020 | Van Schoyck | H04N 17/002 |
| 2004/0167670 A1* | 8/2004 | Goncalves | G05D 1/0274 700/259 |
| 2009/0319170 A1* | 12/2009 | Madsen | A01B 69/001 701/532 |
| 2011/0167574 A1 | 7/2011 | Stout et al. | |
| 2013/0182894 A1* | 7/2013 | Kim | G06T 7/246 382/103 |
| 2013/0314442 A1* | 11/2013 | Langlotz | H04N 5/23238 345/633 |
| 2014/0005933 A1* | 1/2014 | Fong | G01C 21/32 701/447 |
| 2014/0037140 A1* | 2/2014 | Benhimane | G06K 9/6211 382/103 |
| 2014/0044341 A1* | 2/2014 | Sharp | G06K 9/00 382/154 |
| 2014/0098242 A1* | 4/2014 | Sharma | H04N 17/002 348/175 |
| 2014/0350839 A1* | 11/2014 | Pack | G05D 1/0214 701/409 |
| 2015/0103183 A1* | 4/2015 | Abbott | G01C 21/165 348/169 |
| 2015/0212521 A1* | 7/2015 | Pack | G05D 1/0274 701/28 |
| 2015/0310310 A1 | 10/2015 | Hesch et al. | |
| 2015/0314443 A1* | 11/2015 | Yu | B25J 9/1666 701/28 |
| 2016/0055646 A1* | 2/2016 | Wirbel | G06T 7/20 382/107 |
| 2016/0147230 A1* | 5/2016 | Munich | G05D 1/0088 701/28 |
| 2016/0163091 A1* | 6/2016 | Wang | G06T 5/002 382/103 |
| 2016/0188977 A1* | 6/2016 | Kearns | G05D 1/0274 348/113 |
| 2016/0307334 A1* | 10/2016 | Dos Santos Mendonca | G06K 9/46 |
| 2016/0327653 A1 | 11/2016 | Humphreys et al. | |
| 2016/0350906 A1 | 12/2016 | Meier et al. | |
| 2017/0197314 A1* | 7/2017 | Stout | B25J 9/163 |
| 2017/0236302 A1* | 8/2017 | Arth | G06T 7/20 382/103 |
| 2017/0243069 A1* | 8/2017 | Shen | G06K 9/52 |
| 2017/0277197 A1* | 9/2017 | Liao | G06T 7/20 |
| 2017/0316278 A1* | 11/2017 | Guerreiro | G06K 9/00805 |
| 2018/0039276 A1* | 2/2018 | Keivan | G06T 7/74 |
| 2018/0126553 A1* | 5/2018 | Corkum | B25J 9/1692 |
| 2018/0150961 A1* | 5/2018 | Senthamil | G06T 7/75 |
| 2018/0150974 A1* | 5/2018 | Abe | G06K 9/6256 |
| 2018/0188026 A1* | 7/2018 | Zhang | G06T 7/68 |
| 2018/0246515 A1* | 8/2018 | Iwama | B60W 30/06 |
| 2018/0249144 A1* | 8/2018 | Feng | G06T 7/246 |
| 2018/0253107 A1* | 9/2018 | Heinla | G05D 1/0274 |
| 2019/0005670 A1* | 1/2019 | DeTone | G06T 7/35 |
| 2019/0026916 A1* | 1/2019 | Liwicki | G06T 7/74 |
| 2019/0068829 A1* | 2/2019 | Van Schoyck | G05D 1/101 |
| 2019/0068962 A1* | 2/2019 | Van Schoyck | G06K 9/2054 |
| 2019/0147619 A1* | 5/2019 | Goldman | G06T 7/75 382/154 |
| 2019/0243376 A1* | 8/2019 | Davis | G05D 1/0212 |
| 2019/0304133 A1* | 10/2019 | Bang | G06T 7/73 |
| 2019/0311214 A1* | 10/2019 | Lakemond | G06K 9/6215 |
| 2019/0320113 A1* | 10/2019 | Rajvanshi | H04N 5/23222 |
| 2019/0325089 A1* | 10/2019 | Golparvar-Fard | G06T 7/579 |
| 2019/0354110 A1* | 11/2019 | Heinla | G06T 7/73 |
| 2020/0005489 A1* | 1/2020 | Kroeger | G06T 7/73 |
| 2020/0019156 A1* | 1/2020 | Drew | A47L 9/009 |
| 2020/0097006 A1* | 3/2020 | Liu | G06T 7/579 |
| 2020/0117210 A1* | 4/2020 | Ren | G06T 7/73 |
| 2020/0118288 A1* | 4/2020 | Huang | G01O 21/00 |
| 2020/0218279 A1* | 7/2020 | Liu | G06T 7/246 |
| 2020/0241536 A1* | 7/2020 | Liu | G05D 1/0246 |
| 2020/0340817 A1* | 10/2020 | Schomerus | G06T 7/75 |
| 2020/0344464 A1* | 10/2020 | Van Schoyck | G06T 7/0002 |

FOREIGN PATENT DOCUMENTS

| | | |
|---|---|---|
| CN | 105953798 A | 9/2016 |
| CN | 106679648 A | 5/2017 |

* cited by examiner

IMAGE SENSOR INITIALIZATION IN A ROBOTIC VEHICLE

BACKGROUND

Robotic vehicles are being developed for a wide range of applications. Robotic vehicles may be equipped with cameras capable of capturing an image, a sequence of images, or video. Some robotic vehicles may be equipped with a monocular image sensor, such as a monocular camera.

Robotic vehicles may perform simultaneous localization and mapping (SLAM) to construct and update a map of an unknown environment while simultaneously keeping track of the robotic vehicle's location within the environment. A robotic vehicle may gather data useful for SLAM using its image sensor device. However, for robotic vehicles equipped with a monocular image sensor, the image sensor may be unable to provide sufficient information to enable the robotic vehicle to determine both image sensor position and orientation (pose) and map points for the environment. Further, for robotic vehicles equipped with a monocular image sensor, initialization of the image sensor is critical. Errors in initialization of the monocular image sensor may lead to uncorrectable bias or errors in the robotic vehicle's coordinate system.

SUMMARY

Various embodiments include methods that may be implemented on a processor of a robotic vehicle for image sensor initialization of an image sensor of a robotic vehicle.

Various embodiments may include capturing an image of a target image with the image sensor of the robotic vehicle, extracting first features from the captured image, extracting second features from a predefined image pyramid of the target image, matching one or more extracted first features with one or more extracted second features, estimating an image sensor pose based on matched features and known dimensions of the target image, determining whether the image sensor pose is within one or more thresholds, and maneuvering the robotic vehicle to another location from which to capture another image of the target image in response to determining that the image sensor pose is not within the one or more thresholds.

In some embodiments, the image sensor initialization may include a monocular camera-based simultaneous localization and mapping (SLAM) initialization. Some embodiments may further include determining that the image sensor initialization is successful in response to determining that the image sensor pose is within the one or more thresholds.

In some embodiments, maneuvering the robotic vehicle to another location from which to capture another image of the target image may include computing or determining a preferred relative pose in response to determining that the image sensor pose is not within the one or more thresholds, determining a location associated with the preferred relative pose, and maneuvering the robotic vehicle to the determined location.

In some embodiments, maneuvering the robotic vehicle to another location from which to capture another image of the target image may include maneuvering the robotic vehicle to one or more other locations, capturing another image of the target image from each of the other locations, extracting third features from the another image, matching one or more extracted third features with one or more extracted second features, and estimating a second image sensor pose based on matched second and third features and the known dimensions of the target image.

Various embodiments may include capturing an image with the image sensor of the robotic vehicle, extracting first features from the captured image, determining whether a number of extracted features exceeds a threshold number of features, maneuvering the robotic vehicle to another location in response to determining that the number of extracted features exceeds the threshold number of features, obtaining one or more of a translation of the robotic vehicle and a rotation of the robotic vehicle, determining whether an angular velocity of the robotic vehicle is less than an angular velocity threshold, matching one or more extracted first features with one or more second features extracted from a captured second image, and estimating an image sensor pose based on matched features and one of the translation of the robotic vehicle and the rotation of the robotic vehicle.

In some embodiments, matching one or more extracted first features with one or more second features extracted from a captured second image may include maneuvering the robotic vehicle to another location, capturing and processing a next image from the another location, extracting the second features from the next image, and matching the first features from the first image and the second features from the next image.

Some embodiments may further include estimating a scale between a known physical size of an object in the image and an estimated size of the object based on the image. In some embodiments, the estimated size of the object based on the image may be based on matches of the one or more extracted first features with the one or more second features. Some embodiments may further include determining that the image sensor initialization is successful in response to determining that the second image sensor pose is within the one or more thresholds.

Various embodiments may include capturing a first image with the image sensor of the robotic vehicle at a first location, extracting first features from the captured first image, extracting second features from a predefined image pyramid, matching one or more extracted first features with one or more extracted second features, estimating a first image sensor pose based on matched first features and second features and known dimensions of the target image, maneuvering the robotic vehicle to a second location and capturing a second image from the second location, extracting third features from the captured second image, maneuvering the robotic vehicle to a third location and capturing a third image from the third location, extracting fourth features from the captured third image, matching one or more extracted third features with one or more extracted fourth features, estimating a second image sensor pose based on the matched third and fourth features, and determining a coordinate system for the robotic vehicle based on the image sensor pose and the second image sensor pose. In some embodiments, the first image may be an image of a target image, and the second features may be extracted from a predefined image pyramid.

Some embodiments may further include determining that the robotic vehicle has returned to the first location based on the translation of the robotic vehicle and the rotation of the robotic vehicle, capturing a fourth image with the image sensor of the robotic vehicle at a first location, extracting fifth features from the fourth image, matching one or more extracted fifth features and with one or more extracted second features, and estimating a third image sensor pose based on the matched fifth features and second features, wherein determining the coordinate system for the robotic vehicle may include determining the coordinate system for the robotic vehicle based on the first image sensor pose, the second image sensor pose, and the third image sensor pose.

In some embodiments, determining the coordinate system for the robotic vehicle based on the image sensor pose and the second image sensor pose may include performing a bundle adjustment using the first image sensor pose and the second image sensor pose. In some embodiments, performing the bundle adjustment using the image sensor pose and the another image sensor pose may include performing the bundle adjustment using the matched first features and second features. In some embodiments, performing the bundle adjustment using the image sensor pose and the another image sensor pose may include performing the bundle adjustment using the matched third and fourth features. In some embodiments, performing the bundle adjustment using the image sensor pose and the another image sensor pose may include performing the bundle adjustment using the matched fifth features and second features.

Further embodiments may include a robotic vehicle configured with processor-executable instructions to perform operations of any of the methods summarized above. Further embodiments may include a processing device for use in a robotic vehicle configured to perform operations of any of the methods summarized above. Further embodiments may include a robotic vehicle including means for performing functions of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
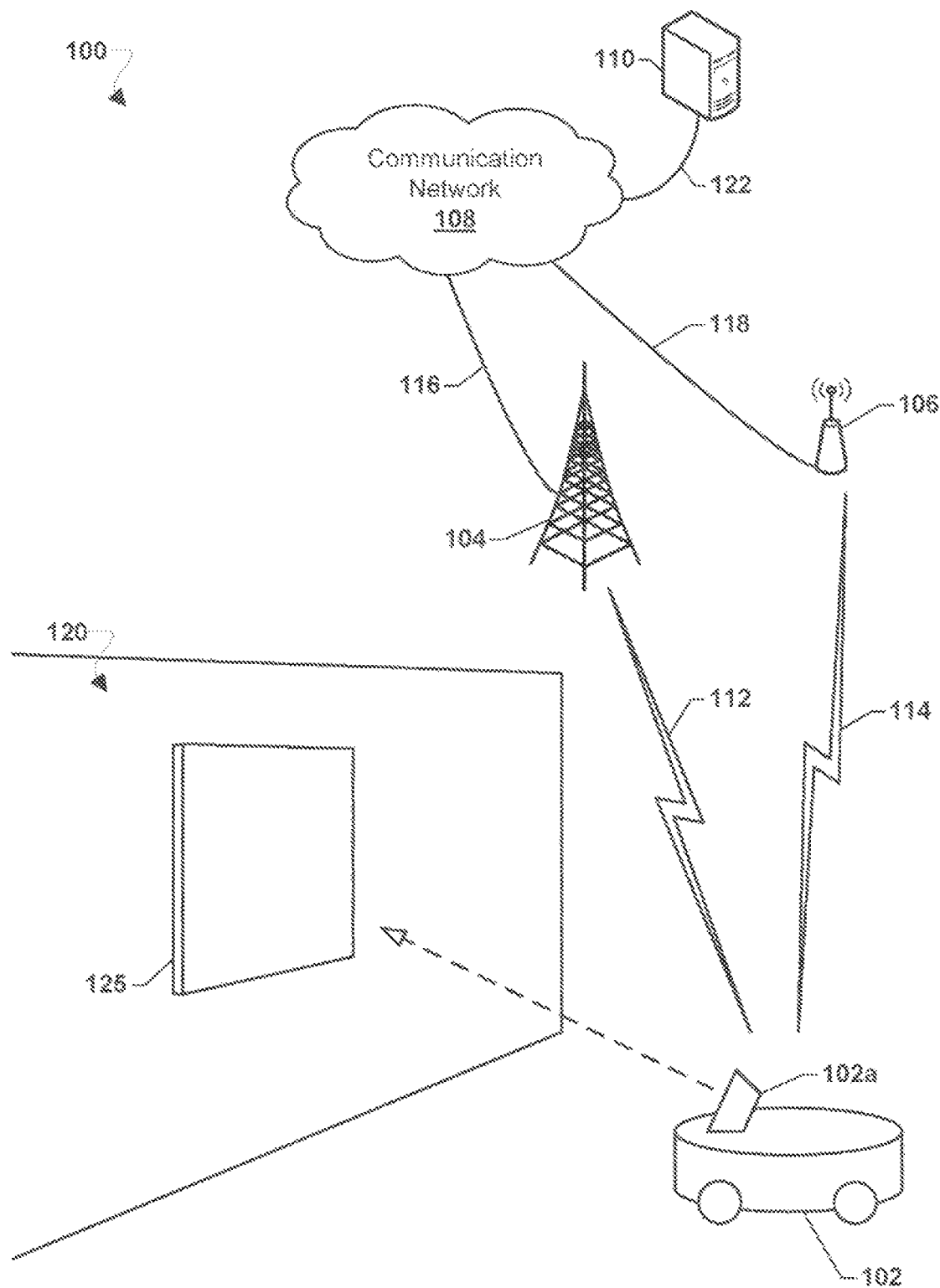
FIG. 1 is a system block diagram of a robotic vehicle operating within communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a robotic vehicle for initializing an image sensor of a robotic vehicle. In some embodiments, the methods may include methods for monocular camera-based SLAM initialization.

As used herein, the term "robotic vehicle" refers to one of various types of vehicles including an onboard processing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors. A robotic vehicle may include a variety of components and/or payloads that may perform a variety of functions.

Robotic vehicles may employ simultaneous localization and mapping (SLAM) techniques to construct and update a map of an unknown environment while simultaneously keeping track of the robotic vehicle's location within the environment. Robotic vehicles are increasingly equipped with image sensor devices for capturing images and video. In some embodiments, the image sensor device may include a monocular image sensor (e.g., a monocular camera). A robotic vehicle may gather data useful for SLAM using the image sensor device.

For robotic vehicles equipped with a monocular image sensor, the image sensor may be unable to provide sufficient information to enable the processing device to determine both image sensor position and orientation (pose) and map points for the environment. Further, for robotic vehicles equipped with a monocular image sensor, initialization of the image sensor is important. Errors in initialization of the monocular image sensor may lead to un-correctable bias or errors in the robotic vehicle's coordinate system. Further, the inherent limitations of a monocular image sensor (i.e., only one point of view, etc.) may permit initialization errors caused by environmental characteristics, such as illumination, a lack of features in the robotic vehicle's environment, and moving objects in the environment.

In various embodiments, a processor device of a robotic vehicle may be configured to perform methods of image sensor initialization. In some embodiments, the methods may include methods of monocular camera-based SLAM initialization. In some embodiments, the processor of the robotic vehicle may capture images of a target image from a plurality of locations, and may use the multiple images to more accurately estimate a pose of an image sensor. For example, poses in a SLAM system may be represented in a coordinate system that may be based on a reference in the robotic vehicle's environment. However, pose estimation that relies only on images of the target image or only on movement sensors may include errors, and therefore may be inaccurate.

In various embodiments, the processor device of the robotic vehicle may perform two (or more) estimations, including a first estimate based on two or more images captured of a target image (e.g., using an image sensor, such as a monocular image sensor) and a second estimate using one or more movement sensors of the robotic vehicle (e.g., a wheel sensor, an inertial measurement sensor, or another similar sensor). In such embodiments, the processor may combine the two or more estimations (e.g., via a bundle adjustment or a similar process), and the (processor may generate a more accurate coordinate system based on the result of the combined estimations.

In some embodiments, the processor device may extract first features from a captured image of the target image, and may extract second features from a predefined image pyramid of the target image. The processor device may match first features and second features, and may estimate an image sensor (pose based on matched features and known dimensions of the target image. In response to determining that the image sensor pose is not within one or more thresholds, the processor device may maneuver the robotic vehicle to one or more other locations from which to capture another image of the target image. In some embodiments, the processor device of the robotic vehicle may obtain a translation of the robotic vehicle and/or a rotation of the robotic vehicle, e.g., from one or more other sensors of the robotic vehicle (e.g., a wheel sensor, an inertial-measurement unit, etc.). In such embodiments, the processor device may estimate the image sensor pose based on matched features and one or more of the translation of the robotic vehicle and the rotation of the robotic vehicle.

Various embodiments may be implemented within a robotic vehicle operating within a variety of communication systems 100, an example of which is illustrated in FIG. 1. With reference to FIG. 1, the communication system 100 may include a robotic vehicle 102, a base station 104, an access point 106, a communication network 108, and a network element 110. In some embodiments, the robotic vehicle 120 may be equipped with an image sensor 102a. In some embodiments, the image sensor 102a may include a monocular image sensor.

The base station 104 and the access point 106 may provide wireless communications to access the communication network 108 over a wired and/or wireless communication backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The robotic vehicle 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The robotic vehicle 102 and the network element 110 may communicate via the communication network 108. The network element 110 may provide the robotic vehicle 102 with a variety of information, such as navigation information, weather information, information about local air, ground, and/or sea traffic, movement control instructions, and other information, instructions, or commands relevant to operations of the robotic vehicle 102.

In various embodiments, the robotic vehicle 102 may move in an environment 120. In some embodiments, the robotic vehicle may use the image sensor 102a to capture one or more images of a target image 125 in the environment 120. In some embodiments, the target image 125 may include a test image, which may include known characteristics, such as a height, a width, a texture, and/or other characteristics.

Figure 2:
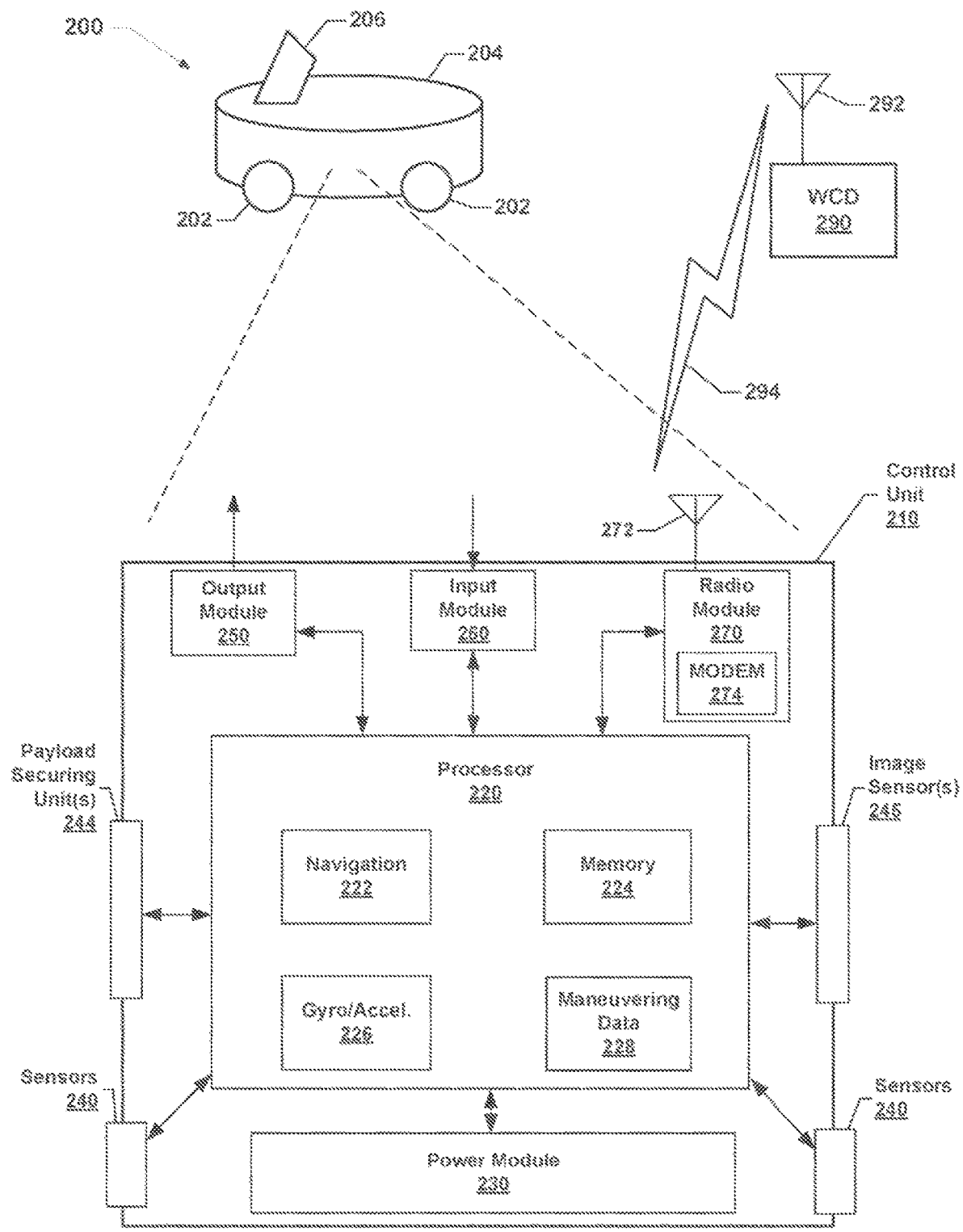
FIG. 2 is a component block diagram illustrating components of a robotic vehicle according to various embodiments.

Robotic vehicles may include winged or rotorcraft varieties. FIG. 2 illustrates an example robotic vehicle 200 of a ground vehicle design that utilizes one or more wheels 202 driven by corresponding motors to provide locomotion to the robotic vehicle 200. The robotic vehicle 200 is illustrated as an example of a robotic vehicle that may utilize various embodiments, but is not intended to imply or require that various embodiments are limited to ground robotic vehicles. For example, various embodiments may be used with rotorcraft or winged robotic vehicles, water-borne robotic vehicles, and space-based robotic vehicles.

With reference to FIGS. 1 and 2, the robotic vehicle 200 may be similar to the robotic vehicle 102. The robotic vehicle 200 may include a number of wheels 202, a body 204, and an image sensor 206. The frame 204 may provide structural support for the motors and their associated wheels 202 as well as for the image sensor 206. For ease of description and illustration, some detailed aspects of the robotic vehicle 200 are omitted such as wiring, frame structure interconnects, or other features that would be known to one of skill in the art. While the illustrated robotic vehicle 200 has wheels 202, this is merely exemplary and various embodiments may include any variety of components to provide propulsion and maneuvering capabilities, such as treads, paddles, skids, or any combination thereof or of other components.

The robotic vehicle 200 may further include a control unit 210 that may house various circuits and devices used to power and control the operation of the robotic vehicle 200. The control unit 210 may include a processor 220, a power module 230, sensors 240, one or more payload securing units 244, one or more image sensors 245, an output module 250, an input module 260, and a radio module 270.

The processor 220 may be configured with processor-executable instructions to control travel and other operations of the robotic vehicle 200, including operations of various embodiments. The processor 220 may include or be coupled to a navigation unit 222, a memory 224, a gyro/accelerometer unit 226, and a maneuvering data module 228. The processor 220 and/or the navigation unit 222 may be configured to communicate with a server through a wireless connection (e.g., a cellular data network) to receive data useful in navigation, provide real-time position reports, and assess data.

The maneuvering data module 228 may be coupled to the processor 220 and/or the navigation unit 222, and may be configured to provide travel control-related information such as orientation, attitude, speed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, an inertial measurement unit (IMU), or other similar sensors. The maneuvering data module 228 may include or receive data from the gyro/accelerometer unit 226 that provides data regarding the orientation and accelerations of the robotic vehicle 200 that may be used in navigation and positioning calculations, as well as providing data used in various embodiments for processing images.

The processor 220 may further receive additional information from one or more image sensors 245 (e.g., a camera, which may be a monocular camera) and/or other sensors 240. In some embodiments, the image sensor(s) 245 may include an optical sensor capable of infrared, ultraviolet, and/or other wavelengths of light. The sensors 240 may also include a wheel sensor, a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations. The sensors 240 may include contact or pressure sensors that may provide a signal that indicates when the robotic vehicle 200 has made contact with a surface. The payload-securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing unit(s) 244, the image sensor(s) 245, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The robotic vehicle 200 may be controlled through control of the individual motors of the rotors 202 as the robotic vehicle 200 progresses toward a destination. The processor 220 may receive data from the navigation unit 222 and use such data in order to determine the present position and orientation of the robotic vehicle 200, as well as the appropriate course towards the destination or intermediate sites. In various embodiments, the navigation unit 222 may include a GNSS receiver system (e.g., one or more global positioning system (GPS) receivers) enabling the robotic vehicle 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio module 270 may be configured to receive navigation signals, such as signals from aviation navigation facilities, etc., and provide such signals to the processor 220 and/or the navigation unit 222 to assist in robotic vehicle navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the robotic vehicle 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a robotic vehicle operator, a third party service (e.g., package delivery, billing, etc.), or a site communication access point. The robotic vehicle 200 may communicate with a server through one or more intermediate communication links, such as a wireless telephony network that is coupled to a wide area network (e.g., the Internet) or other communication devices. In some embodiments, the robotic vehicle 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

Figure 3:
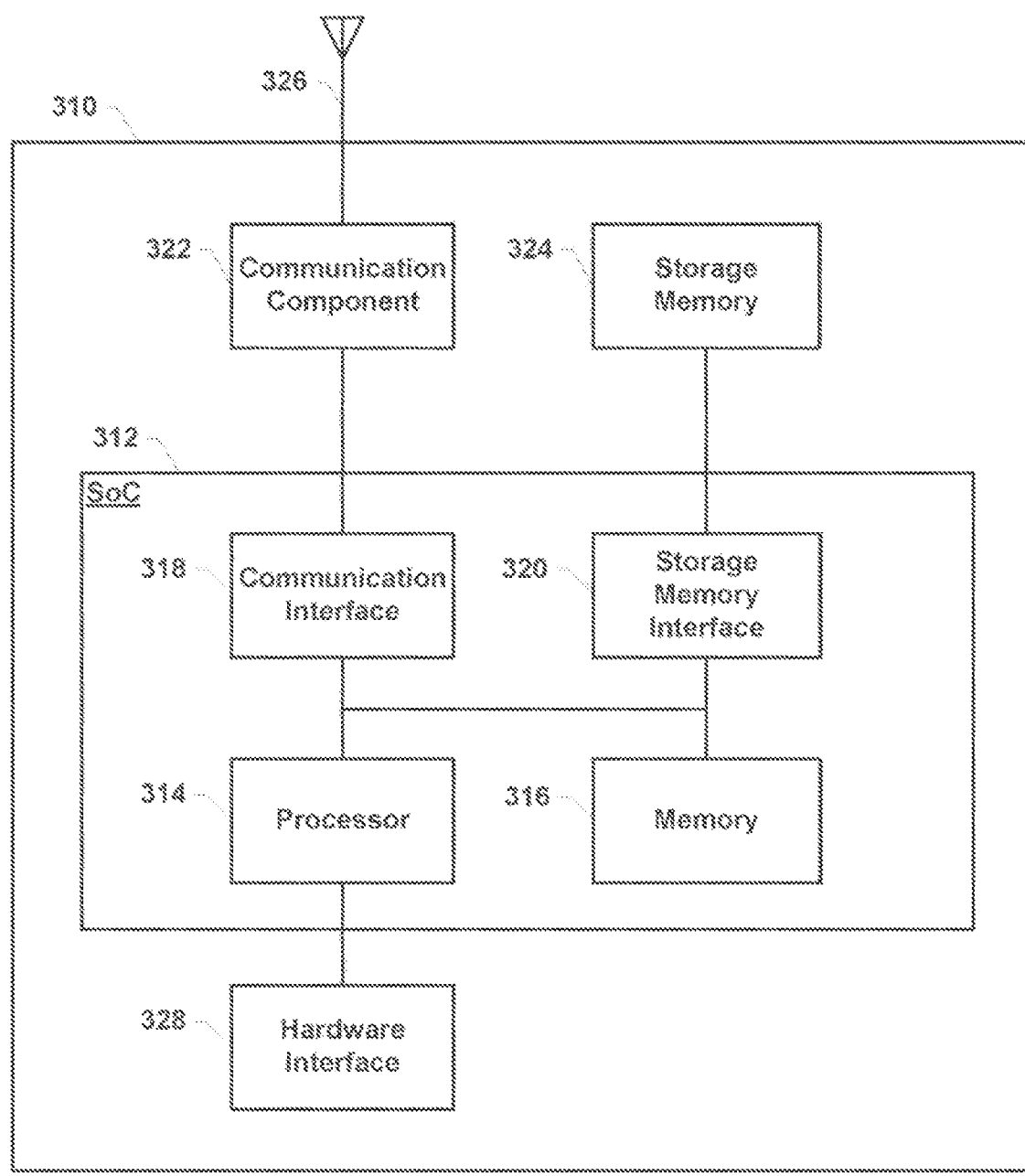
FIG. 3 is a component block diagram illustrating a processing device suitable for use in robotic vehicles implementing various embodiments.

While various components of the control unit 210 are illustrated in FIG. 2 as separate components, some or all of the components (e.g., the processor 220, the output module 250, the radio module 270, and other units) may be integrated together in a single processing device 310, an example of which is illustrated in FIG. 3.

With reference to FIGS. 1-3, the processing device 310 may be configured to be used in a robotic vehicle and may be configured as or including a system-on-chip (SoC) 312. The SoC 312 may include (but is not limited to) a processor 314, a memory 316, a communication interface 318, and a storage memory interface 320. The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a robotic vehicle. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with an SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes.

One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

Figure 4:
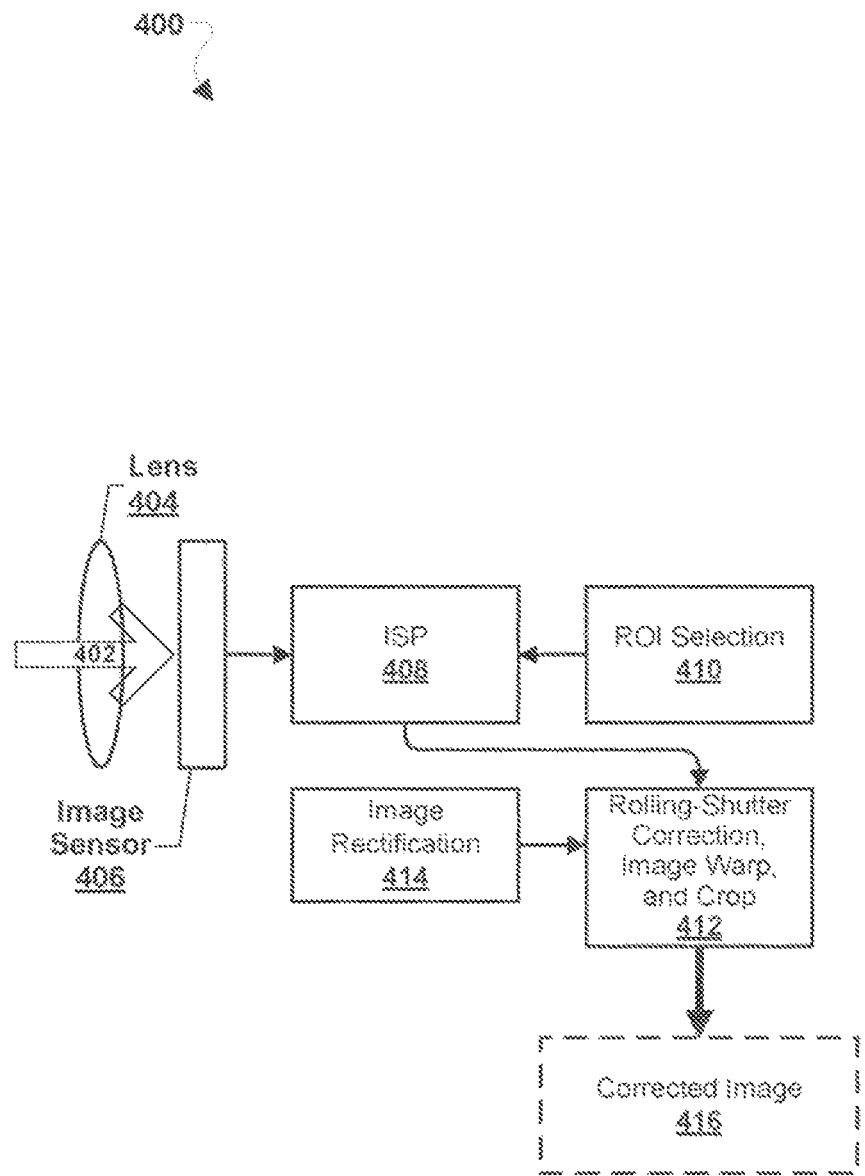
FIG. 4 is a component block diagram illustrating components of an image capture and processing system of a robotic vehicle suitable for use with various embodiments.

FIG. 4 illustrates an image capture and processing system 400 of a robotic vehicle (e.g., 102, 200 in FIGS. 1 and 2) suitable for use with various embodiments. With reference to FIGS. 1-4, the image capture and processing system 400 may be implemented in hardware components and/or software components of the robotic vehicle, the operation of which may be controlled by one or more processors (e.g., the processor 220, the processing device 310, the SoC 312, and/or the like) of the robotic vehicle.

An image sensor 406 may capture light of an image 402 that enters through a lens 404. The lens 404 may include a fish eye lens or another similar lens that may be configured to provide a wide image capture angle. The image sensor 406 may provide image data to an image signal processing (ISP) unit 408. A region of interest (ROI) selection unit 410 may provide data to the ISP 408 data for the selection of a region of interest within the image data. In some embodiments, the image sensor 406 may be similar to the image sensor 102a, 245.

The ISP 408 may provide image information and ROI selection information to a rolling-shutter correction, image warp, and crop unit 412. An image rectification unit 414 may provide information and/or processing functions to the rolling-shutter correction, image warp, and crop unit 426. In some embodiments, the image rectification unit 414 may provide information and/or processing functions to correct for image distortion caused by the lens 404, an image distortion effect caused by the image sensor 406 (e.g., distortion such as wobble, skew, smear, and the like), or other image distortion.

The rolling-shutter correction, image warp, and crop unit 412 may provide as output a corrected image 416. In some embodiments, the corrected image 416 may be based on cropping, distortion correction, and/or application of a transformation matrix. In some embodiments, the corrected image may include an image having a corrected horizontal orientation or horizontal rotation. In some embodiments, the corrected image may include a stabilized video output. Other examples of a corrected image 416 are possible.

Figure 5:
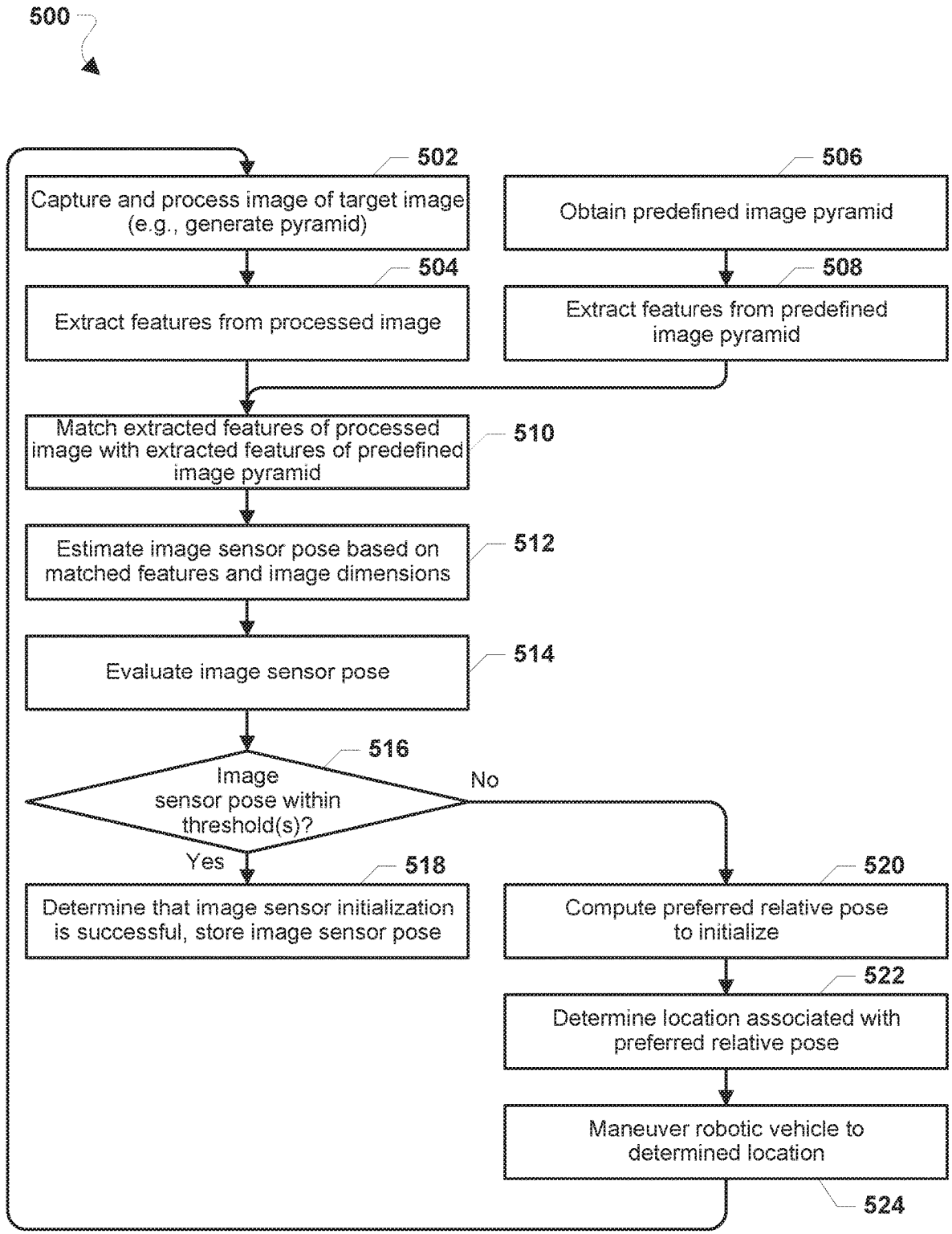
FIG. 5 is a process flow diagram illustrating a method of image sensor initialization in a robotic vehicle according to various embodiments.

FIG. 5 illustrates a method 500 of image sensor initialization in a robotic vehicle according to various embodiments. With reference to FIGS. 1-5, a processor of a robotic vehicle (e.g., the processor 220, the processing device 310, the SoC 312, and/or the like and hardware components and/or software components of the robotic vehicle may capture and process an image using an image sensor of the robotic vehicle (e.g., the image sensor(s) 245).

In block 502, the processor of the robotic vehicle may capture and process an image of a target image. For example, using an image sensor (e.g., the image sensor 1102a, 245) the processor may capture an image from the environment, such as the target image 125. In some embodiments, the processor may process the captured image, for example, the generated representation such as a pyramid representation of the image. In some embodiments, the processor may generate a low pass pyramid. In some embodiments, the processor may generate a band pass pyramid. In some embodiments, the processor may apply a smoothing kernel for a generated pyramid, such as a Gaussian pyramid, a Laplacian pyramid, a Steerable pyramid, or another smoothing kernel or similar processing technique.

In block 504, the processor may extract a plurality of features from the processed image. For example, the processor may analyze or further process the captured image, which may include a very large and/or very complex set of data, and extract (e.g., identify, select, compute) a plurality features from the processed image. In some embodiments, the features may include attribute information of the image. In some embodiments, the processor may analyze and/or process the captured image to generate a feature descriptor or a feature vector (e.g., an n-dimensional vector of numerical features that represent the captured image). In some embodiments, in addition to the attribute information, the processor may generate additional information such as an edge orientation, a gradient magnitude, a polarity and/or strength of an edge detection, relative brightness and/or color information within the image (e.g., blob detection), and other similar additional information.

In block 506, the processor may obtain a predefined image pyramid. For example, the processor may obtain from a memory of the robotic vehicle a pre-stored or predefined image pyramid. In some embodiments, the predefined image pyramid may be based on the image in the environment (e.g., the target image 125).

In block 508, the processor of the robotic vehicle may extract a plurality of features from the predefined image pyramid.

In various embodiments, the image in the environment may include test image, and the processor may be configured to capture an image of the test image and compare features extracted from the captured image of the test image and features extracted from a predefined image pyramid of the test image.

In various embodiments, the operations of blocks 502 and 504 may be performed before, after, or substantially simultaneously with the operations of blocks 506 and 508.

In block 510, the processor may match the extracted features of the processed image (e.g., from the operations of block 504) with extracted features of the predefined image pyramid (e.g., from the operations of block 508). In some embodiments, the processor may identify a set of points in the processed image and a set of points of the predefined image pyramid that correspond (e.g., are substantially the same in both images) by matching features in the processed image with corresponding features in the predefined image pyramid. In some embodiments, the (processor may determine that two or more points correspond based on a metric such as a degree of error of a descriptor (e.g., within a threshold value or range), a distance between the two or more points being within a threshold distance, and other similar metrics. In some embodiments, the correspondence may include a degree of translation, a degree of rotation, a difference in illumination, or another difference, distinction, characteristic, or aspect of the two or more points that may be compared.

In block 512, the processor may estimate a pose of the image sensor (an "image sensor pose") based on matched features and known dimensions of the image. In some embodiments, the processor may obtain the image dimensions (e.g., dimensions of the target image 125) from the memory of the robotic vehicle. In some embodiments, the processor may perform relative pose estimation using a variety of methods. In some embodiments, the processor may determine an Essential matrix, such as by determining a fundamental matrix based on relationship(s) between extracted features of the processed image and extracted features of the predefined image pyramid. In some embodiments, the processor may determine a homography matrix based on a relationship (e.g., a correlation) between features in projections of a plane of the processed image and the predefined image pyramid. In some embodiments, the processor may employ a geometric (e.g., keypoint-based) bundle adjustment to match features of the processed image and of the predefined image pyramid, such as an Essential matrix based method, homography based method, bundle adjustment, etc.

In block 514, the processor may evaluate the image sensor pose. In some embodiments, the processor may compare the image sensor pose with one or more thresholds. For example, the processor may compare a relative translation of the image sensor pose with a threshold relative translation. In some embodiments, the relative translation may represent a number of pixels of the captured image. In such embodiments, a relative translation that exceeds the threshold may include a number of picture elements (e.g., pixels) that is too few to obtain an image sensor pose estimation with sufficiently high quality. In some embodiments, the processor may compare the relative rotation of the image sensor pose (e.g., a relative rotation between the robotic vehicle and the image) with a threshold relative rotation. In some embodiments, the relative rotation may represent a projection angle of the captured image. In such embodiments, a relative rotation that exceeds the threshold may include a projection angle that is too large to obtain an image sensor pose estimation with sufficiently high quality. In some embodiments, the processor may compare a relative illumination of the image sensor pose with a threshold relative illumination. In some embodiments, the relative elimination may represent an illumination level of one or more pixels, a pixel blob, etc. of the captured image.

In determination block 516, the processor of the robotic vehicle may determine whether the image sensor pose is within the one or more thresholds (e.g., the threshold relative translation and/or the threshold relative rotation).

In response to determining that the image sensor pose is within the one or more thresholds (i.e., determination block 516="Yes"), the processor may determine that the image sensor initialization is successful, and may store the image sensor pose in block 518.

In response to determining that the image sensor pose of the image sensor is not within the one or more thresholds (i.e., determination block 516="No"), the processor may compute a preferred relative pose to initialize in block 520. In some embodiments, the preferred relative pose may include a difference between the image (e.g., the target image 125) and the image sensor.

In block 522, the processor may determine a location associated with the preferred relative pose. For example, the robotic vehicle processor may calculate a location based on a distance between the image sensor pose and the preferred relative pose.

In block 524, the processor maneuver the robotic vehicle to the determined location.

The processor may capture and process an image (e.g., of the target image 125) in block 502.

Figure 6A:
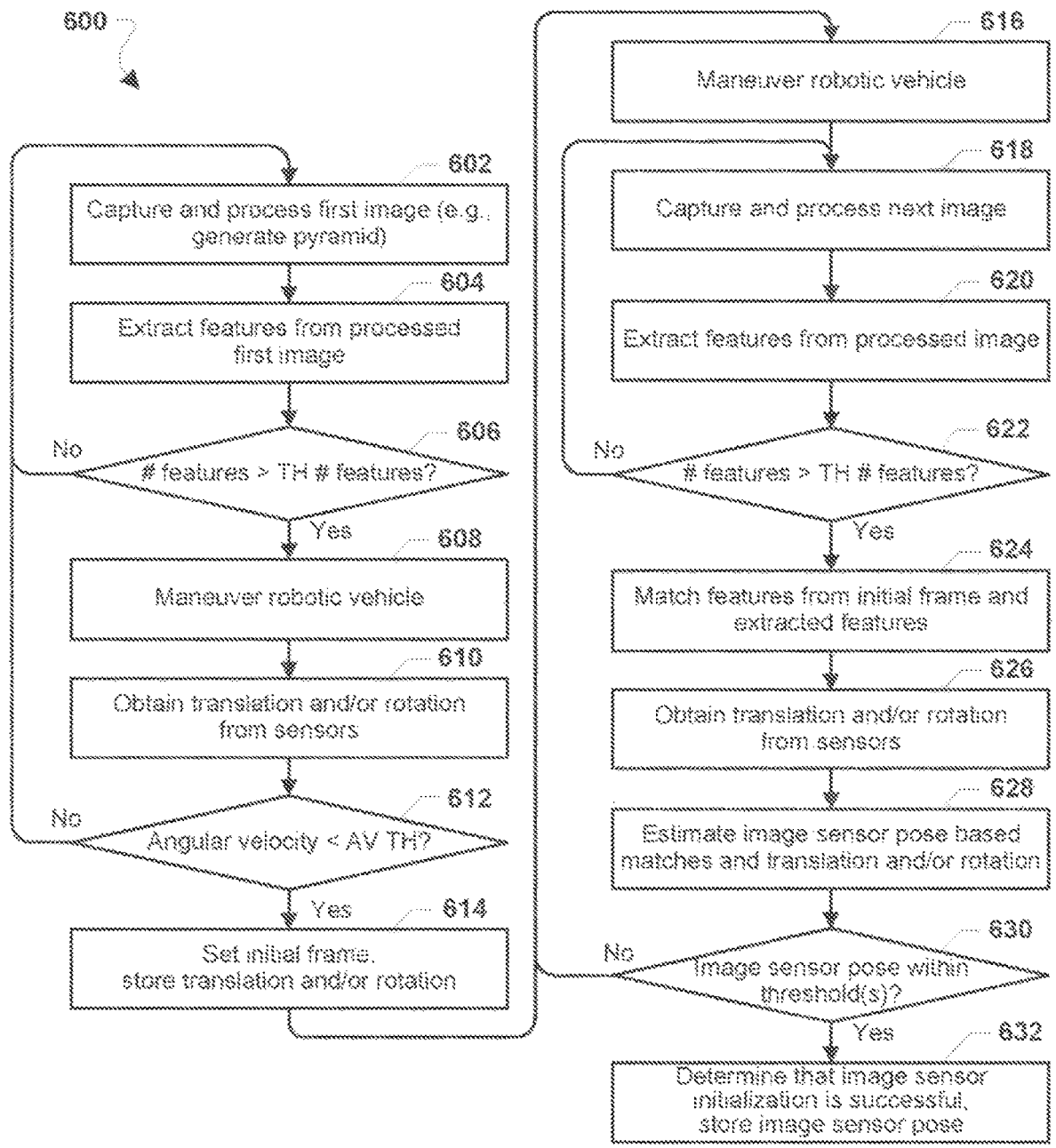
FIG. 6A is a process flow diagram illustrating a method of image sensor initialization in a robotic vehicle according to various embodiments.

FIG. 6A illustrates a method 600 of image sensor initialization in a robotic vehicle according to various embodiments. With reference to FIGS. 1-6A, a processor of a robotic vehicle (e.g., the processor 220, the processing device 310, the SoC 312, and/or the like and hardware components and/or software components of the robotic vehicle may capture and process an image using an image sensor of the robotic vehicle (e.g., the image sensor(s) 245).

In block 602, the processor of the robotic vehicle may capture and process an image. For example, using an image sensor (e.g., the image sensor 102*a*, 245) the processor may capture an image from the environment. In some embodiments, the captured image may be of any aspect of the environment (e.g., any object or feature). In some embodiments, the captured image may be of a target image, such as the target image 125. In some embodiments, the processor may process the captured image, for example, the generated representation such as a pyramid representation of the image. In some embodiments, the operations of block 602 may be similar to the operations of block 502 of the method 500.

In block 604, the processor may extract a plurality of features from the processed image. For example, the processor may analyze or further process the captured image, which may include a very large and/or very complex set of data, and extract (e.g., identify, select, compute) a plurality features from the processed image. In some embodiments, the operations of block 604 may be similar to the operations of block 504 of the method 500.

In determination block 606, the processor of the robotic vehicle may determine whether a number of extracted features is greater than a threshold number of features. For example, the processor may determine whether the number of features extracted is sufficiently large (i.e., exceeds a threshold number of features) for use in determining a pose of the image sensor.

In response to determining that the number of features extracted is not greater than the threshold number of features (i.e., determination block 606="No"), the processor may again capture and process an image in block 602.

In response to determining that the number of features extracted is greater than the threshold number of features (i.e., determination block 606="Yes"), the processor may maneuver the robotic vehicle to another location in block 608.

In block 610, the processor may obtain a translation and/or a rotation of the robotic vehicle from sensors of the robotic vehicle. For example, the processor may obtain from an inertial measurement unit, a wheel encoder, accelerometer, or another sensor information that the processor may use to determine the translation and/or the rotation of the robotic vehicle.

In determination block 612, the processor may determine whether an angular velocity of the robotic vehicle is less than an angular velocity threshold (e.g., AV TH).

In response to determining that the angular velocity is not less than the angular velocity threshold (i.e., determination block 612="No"), the processor may again capture and process an image in block 602.

In response to determining that the angular velocity is less than the angular velocity threshold (i.e., determination block 612="Yes"), the processor may set an initial frame, and may store the obtained translation and/or rotation in block 614.

In block 616, the processor may maneuver the robotic vehicle to another location.

In block 618, the processor may capture and process a next image (e.g., another image, such as an image from the environment. For example, at a later time, the processor may capture and process a second (or subsequent) image (which may be of the target image 125).

In block 620, the processor may extract features from the processed image.

In determination block 622, the processor of the robotic vehicle may determine whether a number of features extracted from the next image is greater than a threshold number of features. For example, the processor may determine whether the number of features extracted is sufficiently large (i.e., exceeds a threshold number of features) for use in determining a pose of the image sensor.

In response to determining that the number of features extracted is not greater than the threshold number of features (i.e., determination block 622="No"), the processor may continue to capture and process images of the target image in block 618.

In response to determining that the number of features extracted is greater than the threshold number of features i.e., determination block 622="Yes"), the processor may match the extracted features of the processed image (e.g., from the operations of block 604) with extracted features of the second (or subsequent) image (e.g., from the operations of block 620) in block 624.

In block 626, the processor may obtain the translation and/or the rotation of the robotic vehicle from movement sensors of the robotic vehicle. In some embodiments, the obtained translation and/or rotation of the robotic vehicle may be related to the capture and processing of the second image of the target image (e.g., from the operations of block 618).

In block 628, the processor may estimate the pose of the image sensor (the image sensor pose) based on matched features and the translation and/or rotation of the robotic vehicle. In some embodiments, the processor may estimate the pose of the image sensor based on a combination of matched features from two or more images (e.g., the initial frame and one or more next images). In some embodiments, the processor may estimate the pose of the image sensor based on a combination of translations and/or rotations associated with the two or more images.

In determination block 630, the processor of the robotic vehicle may determine whether the image sensor pose is within the one or more thresholds (e.g., the threshold relative translation and/or the threshold relative rotation).

In response to determining that the image sensor pose is not within the one or more thresholds (i.e., determination block 630="No"), the processor may maneuver the robotic vehicle to another location in block 616, and may capture and process a next image of the target image in block 618.

In response to determining that the image sensor pose is within the one or more thresholds (i.e., determination block 630="Yes"), the processor may determine that the image sensor initialization is successful, and may store the image sensor pose in block 632.

Figure 6B:
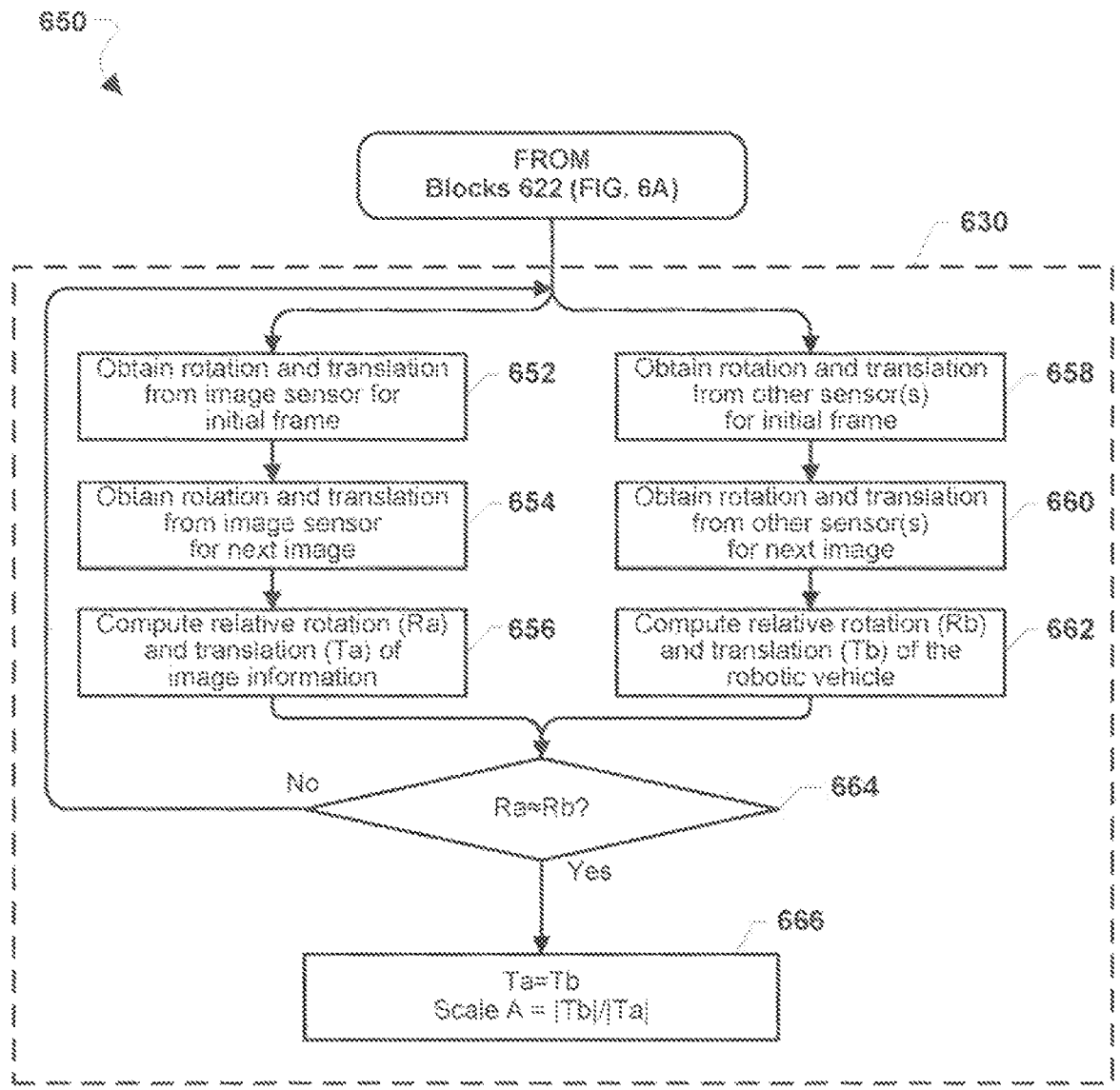
FIG. 6B is a process flow diagram illustrating a method of image sensor initialization in a robotic vehicle according to various embodiments.

FIG. 6B illustrates a method 650 that may be performed in block 630 (FIG. 6A). With reference to FIGS. 1-6B, the operations of the method 650 may be performed by a processor of a robotic vehicle (e.g., the processor 220, the processing device 310, the SoC 312, and/or the like and hardware components and/or software components of the robotic vehicle).

In block 652, the processor may obtain rotation and translation information from the image sensor for the initial frame (e.g., the first image of the target image).

In block 654, the processor may obtain rotation and translation information from the image sensor for the next image of the target image.

In block 656, the processor may compute a relative rotation matrix (e.g., Ra) and a translation matrix (e.g., Ta) of the image information (e.g., based on a comparison of, or differences between, the rotation and translation information for the initial frame and for the next image). In various embodiments, the relative rotation and translation of the image information may be in the form of matrices or vectors.

In block 658, the processor may obtain rotation and translation information of the robotic vehicle from one or more movement sensors for the initial frame.

In block 660, the processor may obtain rotation and translation information of the robotic vehicle from one or more movement sensors for the next image.

In block 662, the processor may compute a relative rotation matrix (e.g., Rb) and translation matrix (e.g., Tb) of the robotic vehicle (e.g., based on a comparison of, or differences between, the rotation and translation information from the one or more movement sensors for the initial frame and for the next image).

In determination block 664, the processor may determine whether the computed relative rotation matrix of the image information (e.g., Ra) is approximately equal to the computed relative rotation matrix of the robotic vehicle (e.g., Rb). For example, the processor may determine whether the computed relative rotation matrix or vector of the image information (e.g., Ra) differs from the computed relative rotation matrix or vector of the robotic vehicle (e.g., Rb) by a similarity (third) threshold.

In response to determining that the relative rotation of the image information is not approximately equal to the relative rotation of the robotic vehicle (e.g., Ra is not ≈Rb) (i.e., determination block 664="No"), the processor may again obtain rotation and translation information from the image sensor for the initial frame in block 652 and obtain rotation and translation information from one or more movement sensors for the initial frame in block 658.

In response to determining that the relative rotation of the image information is approximately equal to the relative rotation of the robotic vehicle (e.g., Ra≈Rb) (i.e., determination block 664="Yes"), the processor may determine that the image information translation matrix (e.g., Ta) is equal to the translation matrix of the robotic vehicle (e.g., Tb), and may calculate a scalar value (e.g., Scale A) for the image pose equal to a determinant of the translation matrix of the robotic vehicle (e.g., |Tb|) over a determinant of the translation matrix of the image information (e.g., |Ta|) in block 666. In some embodiments, the scalar value for the image pose (e.g., Scale A) may include a scale between the estimated image size and a known physical size of the target image.

In some embodiments, the processor may improve the accuracy of the computation of the scalar value for the image pose by obtaining information from a plurality of next images. For example, the processor may maneuver the robotic vehicle to a plurality of locations. The processor may capture and process an image of the target image from one or more of the plurality of locations. The processor may extract features from such images. The processor may also obtain rotation and/or translation information from one or more other sensors for each of the plurality of locations. The processor may use a combination of the rotation and translation information for each of the images obtained from the plurality of locations, as well as the rotation and translation for the initial frame, to compute a scalar value for the image pose based on the rotation and translation information of the images of the target image and the rotation and translation information from the one or more sensors from the plurality of locations.

Figure 6C:
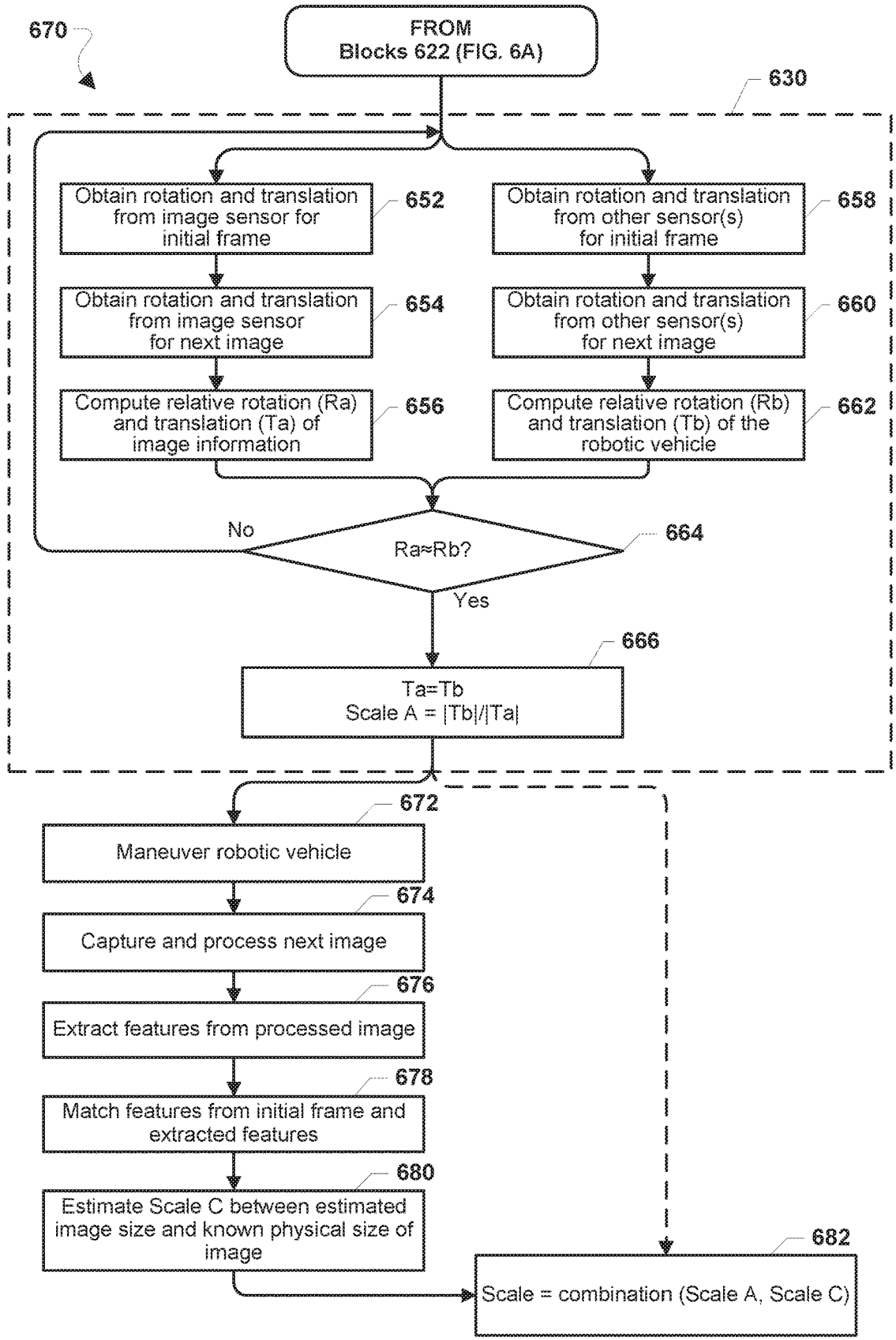
FIG. 6C is a process flow diagram illustrating a method of image sensor initialization in a robotic vehicle according to various embodiments.

For example, FIG. 6C illustrates a method 670 that may be performed to improve the accuracy of image pose estimation. With reference to FIGS. 1-6C, the operations of the method 670 may be performed by a processor of a robotic vehicle (e.g., the processor 220, the processing device 310, the SoC 312, and/or the like and hardware components and/or software components of the robotic vehicle). In blocks 652-666, the device processor may perform operations of like-numbered blocks of the method 650.

In block 672, the processor may maneuver the robotic vehicle to another location.

In block 674, the processor may capture and process another image. In some embodiments, the processor may capture and process another image of the target image 125. For example, at a later time, the processor may capture and process a second (or subsequent) image. In some embodiments, the captured image may be of any aspect of the environment (e.g., the object or feature of which the image is captured in operation 602). In some embodiments, the captured image may be of a target image, such as the target image 125.

In block 676, the processor may extract features from the processed image.

In block 678, the processor may match the extracted features of the processed image with extracted features of the next image.

In block 680, the processor may estimate a scale (e.g., Scale C) between an estimated image size of the target image determined from the next image and the known physical size of the target image.

In block 682, the processor may determine a scale based on a combination of two or more estimated scales (e.g., Scale A, Scale C). In some embodiments, the processor may use the determined scale to estimate the image sensor pose.

For example, for both image sensor and movement sensors, the processor may determine a relative rotation from the initial frame to a next frame using information from the image sensor, and information from one or more other sensors. In some embodiments, using such information the processor may compute a relative rotation, and may further compute a translation and scale corresponding to the image sensor. In various embodiments, the processor may assume that a relative pose and sampling time between the image sensor and the one or more other sensors have been calibrated such that they may be ignored in various computations performed by the processor.

Figure 7:
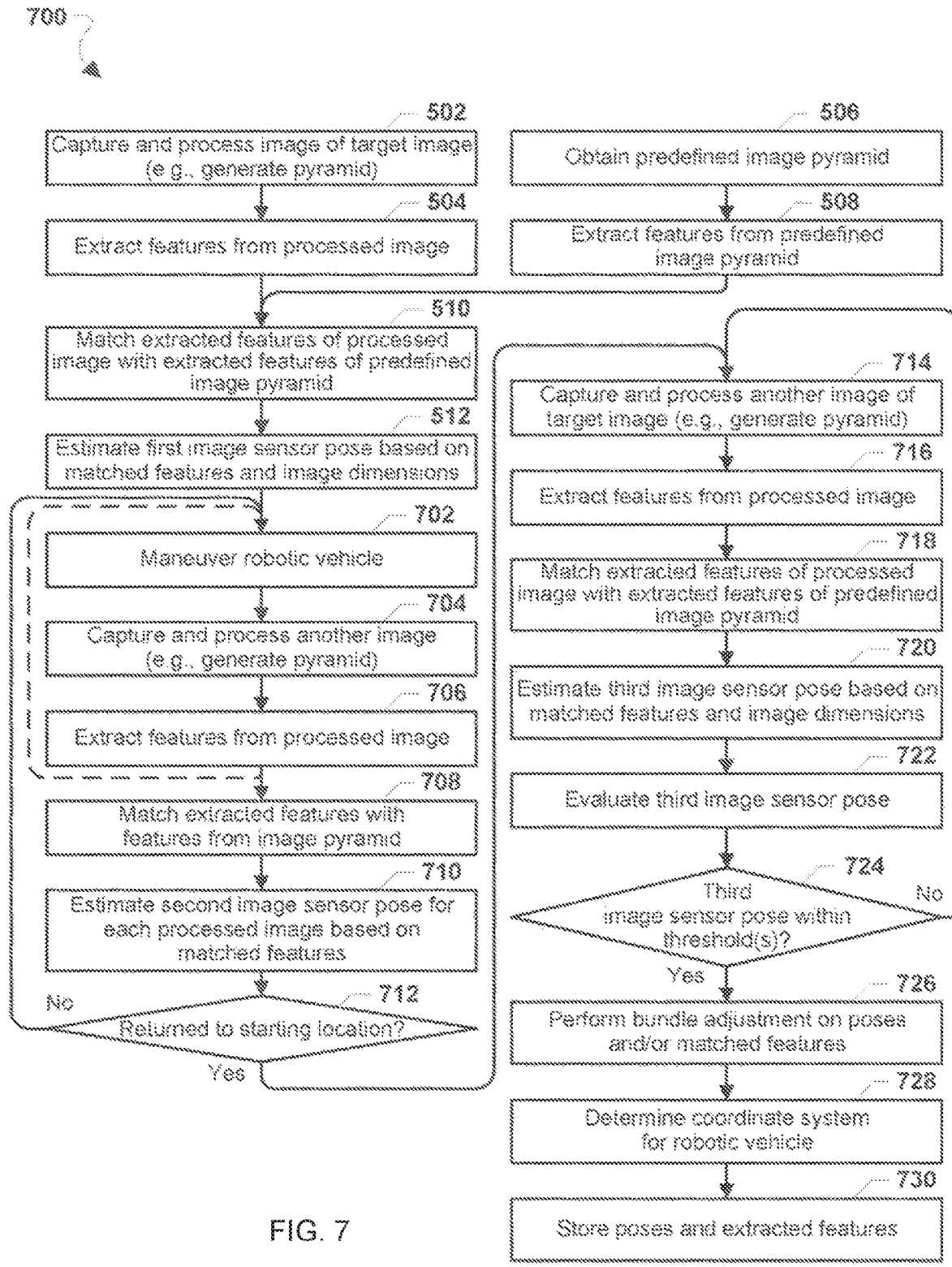
FIG. 7 is a process flow diagram illustrating a method of image sensor initialization in a robotic vehicle according to various embodiments.

FIG. 7 illustrates a method 700 of image sensor initialization in a robotic vehicle according to various embodiments. With reference to FIGS. 1-7, a processor of a robotic vehicle (e.g., the processor 220, the processing device 310, the SoC 312, and/or the like) and hardware components and/or software components of the robotic vehicle may capture and process an image using an image sensor of the robotic vehicle (e.g., the image sensor(s) 245). In blocks 502-512, the processor may perform operations of like-numbered blocks of the method 500.

In block 702, the processor may maneuver the robotic vehicle. In some embodiments, the processor may maneuver the robotic vehicle to a location that is different from a first location (e.g., the location from which the image of the target image is captured in block 502, or a location where the operations of blocks 502-512 are performed). In some embodiments, the processor may maneuver the robotic vehicle according to a pattern, such as a loop, a geometric shape, or another pattern.

In block 704, the processor may capture and process another image.

In block 706, the processor may extract a plurality of features from the processed image. For example, the processor may analyze or further process the captured image, which may include a very large and/or very complex set of data, and extract (e.g., identify, select, compute) a plurality features from the processed image.

In various embodiments, the processor may repeat the operations of blocks 702-706 at least once. For example, the processor may maneuver the robotic vehicle to a first position, capture and process another image from the first position, and extract features from the processed image, and then the processor may maneuver the robotic vehicle to a second session capture and process another image from the second position, and extract features from the processed image from the second position.

In block 708, the processor may match the extracted features of the processed image (e.g., from the operations of block 706) with extracted features of an image pyramid. For example, the processor may match features extracted from the processed image that was captured at the second position with extracted features of processed image that was captured at the first position (e.g., an image pyramid).

In block 710, the processor may estimate a second pose of the image sensor (a "second image sensor pose") for each processed image based on the matched features. In determination block 712, the processor may determine whether the robotic vehicle has returned to its starting location.

In response to determining that the robotic vehicle has not returned to its starting location (e.g., determination block 712="No"), the processor may maneuver the robotic vehicle to another location in block 702.

In response to determining that the robotic vehicle has returned to its starting location (e.g., determination block 712="Yes"), the processor may capture and process another image of the target image In block 716, the processor may extract a plurality of features from the processed image.

In block 718, the processor may match the extracted features of the processed image with extracted features of the predefined image pyramid.

In block 720, the processor may estimate a third pose of the image sensor (a "third image sensor pose") based on matched features and dimensions of the image. In some embodiments, the processor may obtain the image dimensions (e.g., dimensions of the test image) from the memory of the robotic vehicle. In some embodiments, processor may determine the third image sensor pose based on the images captured, the features extracted, the first image sensor pose, and/or the second image sensor pose.

In block 722, the processor may evaluate the third image sensor pose.

In determination block 724, the processor of the robotic vehicle may determine whether the third image sensor pose is within the one or more thresholds (e.g., a threshold relative translation and/or a threshold relative rotation).

In response to determining that the third image sensor pose is not within the one or more thresholds (i.e., determination block 724="No"), the processor may capture and process another image of the target image in block 714.

In response to determining that the third image sensor pose is within the one or more thresholds (i.e., determination block 724="Yes"), the processor may perform a bundle adjustment on a plurality of poses and/or matched features in block 726. In some embodiments, the processor may perform the bundle adjustment using the first image sensor pose and the second image sensor pose(s). In some embodiments, the processor may perform the bundle adjustment using the first image sensor pose, the second image sensor pose(s), and the third image sensor pose. In some embodiments, the processor may perform the bundle adjustment using the extracted features of the processed image (e.g., from the operations of block 706) that are matched with the extracted features of the predefined image pyramid (e.g., from the operations of block 508). In some embodiments, the processor may perform the bundle adjustment using the extracted features of the another image (e.g., from the operations of block 716) that are matched with the extracted features of the predefined image pyramid.

In block 728, the processor may determine a coordinate system for the robotic vehicle. In some embodiments, the processor may determine the coordinate system based on the bundle adjustment using the first image sensor pose, the second image sensor pose(s), and/or the third image sensor pose.

In block 730, the processor may store the poses and the extracted features (e.g., as described with respect to the operations of blocks 504, 512, 706, 710, 716, and 722).

Various embodiments enable the processor of the robotic vehicle to improve the initialization of an image sensor of the robotic vehicle. Various embodiments also improve the accuracy of the robotic vehicle's SLAM capabilities using a more accurately initialize image sensor. Various embodiments also improve capability of a robotic vehicle to initialize a monocular image sensor for use with SLAM determinations.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 650, 670, and 700 may be substituted for or combined with one or more operations of the methods 500, 600, 650, 670, and 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (AMC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of image sensor initialization of an image sensor of a robotic vehicle, comprising:
   capturing an image of a target image with the image sensor of the robotic vehicle;
   extracting, by a processor, first features from the captured image;
   extracting, by the processor, second features from a predefined image pyramid of the target image;
   matching, by the processor, one or more extracted first features with one or more extracted second features;
   estimating, by the processor, an image sensor pose based on matched features and known dimensions of the target image;
   determining, by the processor, whether the image sensor pose is within one or more thresholds; and
   in response to determining that the image sensor pose is not within the one or more thresholds:
      computing, by the processor, a preferred relative image sensor pose in response to determining that the image sensor pose is not within the one or more thresholds, wherein the preferred relative image sensor pose comprises a difference between the image and the image sensor;
      determining, by the processor, a location associated with the preferred relative pose; and
      maneuvering the robotic vehicle to the determined location from which to capture another image of the target image.

2. The method of claim 1, wherein the image sensor initialization comprises monocular camera-based simultaneous localization and mapping (SLAM) initialization.

3. The method of claim 1, further comprising:
   determining, by the processor, that the image sensor initialization is successful in response to determining that the image sensor pose is within the one or more thresholds.

4. The method of claim 1, wherein maneuvering the robotic vehicle to another location from which to capture another image of the target image comprises:
   maneuvering the robotic vehicle to one or more other locations;
   capturing, by the processor, another image of the target image from each of the other locations;
   extracting, by the processor, third features from the another image;
   matching, by the processor, one or more extracted third features with one or more extracted second features; and
   estimating, by the processor, a second image sensor pose based on matched second and third features and the known dimensions of the target image.

5. A method of image sensor initialization of an image sensor of a robotic vehicle, comprising:
   capturing an image with the image sensor of the robotic vehicle;
   extracting, by a processor, first features from the captured image;
   determining, by the processor, whether a number of extracted features exceeds a threshold number of features;
   maneuvering the robotic vehicle to another location in response to determining that the number of extracted features exceeds the threshold number of features;
   obtaining, by the processor, one or more of a translation of the robotic vehicle and a rotation of the robotic vehicle using a movement sensor of the robotic vehicle;
   determining, by the processor, whether an angular velocity of the robotic vehicle is less than an angular velocity threshold;
   matching, by the processor, one or more extracted first features with one or more second features extracted from a captured second image;

estimating, by the processor, an image sensor pose based on matched features and one of the translation of the robotic vehicle and the rotation of the robotic vehicle;

computing a first relative rotation matrix based on image information from the captured image and a second relative rotation matrix based on the one or more of the translation of the robotic vehicle and the rotation of the robotic vehicle obtained using the movement sensors of the robotic vehicle; and determining whether the first relative rotation matrix is approximately equal to the second relative rotation matrix.

6. The method of claim 5, wherein matching, by the processor, one or more extracted first features with one or more second features extracted from a captured second image comprises:

maneuvering the robotic vehicle to another location;
capturing and processing, by the processor, a next image from the another location;
extracting, by the processor, the second features from the next image; and
matching the first features from the first image and the second features from the next image.

7. The method of claim 5, further comprising:
estimating a scale between a known physical size of an object in the image and an estimated size of the object based on the image.

8. The method of claim 7, wherein the estimated size of the object based on the image is based on matches of the one or more extracted first features with the one or more second features.

9. The method of claim 5, further comprising:
determining, by the processor, that the image sensor initialization is successful in response to determining that the second image sensor pose is within the one or more thresholds.

10. A method of image sensor initialization of an image sensor of a robotic vehicle, comprising:
capturing a first image with the image sensor of the robotic vehicle at a first location;
extracting, by a processor, first features from the captured first image;
extracting, by the processor, second features from a predefined image pyramid;
matching, by the processor, one or more extracted first features with one or more extracted second features;
estimating, by the processor, a first image sensor pose based on matched first features and second features and known dimensions of the target image;
maneuvering the robotic vehicle to a second location and capturing a second image from the second location;
extracting, by the processor, third features from the captured second image;
maneuvering the robotic vehicle to a third location and capturing a third image from the third location;
extracting, by the processor, fourth features from the captured third image;
matching, by the processor, one or more extracted third features with one or more extracted fourth features;
estimating, by the processor, a second image sensor pose based on the matched third and fourth features;
determining, by the processor, that the robotic vehicle has returned to the first location based on a translation of the robotic vehicle and a rotation of the robotic vehicle;
capturing a fourth image with the image sensor of the robotic vehicle at the first location in response to determining that the robotic vehicle has returned to the first location;
extracting, by the processor, fifth features from the fourth image;
matching, by the processor, one or more extracted fifth features and with one or more extracted second features;
estimating, by the processor, a third image sensor pose based on the matched fifth features and second features; and
determining the coordinate system for the robotic vehicle based on the first image sensor pose, the second image sensor pose, and the third image sensor pose.

11. The method of claim 10, wherein the first image is an image of a target image, and wherein the second features are extracted from a predefined image pyramid.

12. The method of claim 10, wherein determining the coordinate system for the robotic vehicle based on the image sensor pose and the second image sensor pose comprises:
performing a bundle adjustment using the first image sensor pose and the second image sensor pose.

13. The method of claim 12, wherein performing the bundle adjustment using the image sensor pose and the another image sensor pose comprises:
performing the bundle adjustment using the matched first features and second features.

14. The method of claim 12, wherein performing the bundle adjustment using the image sensor pose and the another image sensor pose comprises:
performing the bundle adjustment using the matched third and fourth features.

15. The method of claim 12, wherein performing the bundle adjustment using the image sensor pose and the another image sensor pose comprises:
performing the bundle adjustment using the matched fifth features and second features.

16. A robotic vehicle, comprising:
an image sensor;
a processor coupled to the image sensor and configured with processor-executable instructions to:
capture an image of a target image with the image sensor;
extract first features from the captured image;
extract second features from a predefined image pyramid of the target image;
match one or more extracted first features with one or more extracted second features;
estimate an image sensor pose based on matched features and known dimensions of the target image;
determine whether the image sensor pose is within one or more thresholds; and
in response to determining that the image sensor pose is not within the one or more thresholds:
compute a preferred relative image sensor pose in response to determining that the image sensor pose is not within the one or more thresholds;
determine a location associated with the preferred relative pose; and
maneuver the robotic vehicle to the determined location from which to capture another image of the target image.

17. The robotic vehicle of claim 16, wherein the processor is further configured with processor-executable instructions such that the image sensor initialization comprises a monocular camera-based simultaneous localization and mapping (SLAM) initialization.

18. The robotic vehicle of claim 16, wherein the processor is further configured with processor-executable instructions to:
determine that the image sensor initialization is successful in response to determining that the image sensor pose is within the one or more thresholds.

19. The robotic vehicle of claim 16, wherein the processor is further configured with processor-executable instructions to:
maneuver the robotic vehicle to one or more other locations;
capture another image of the target image from each of the other locations;
extract third features from the another image;
match one or more extracted third features with one or more extracted second features; and
estimate a second image sensor pose based on matched second and third features and the known dimensions of the target image.

20. A robotic vehicle, comprising:
an image sensor;
a processor coupled to the image sensor and configured with processor-executable instructions to:
capture a first image with the image sensor;
extract first features from the captured image;
determine whether a number of extracted features exceeds a threshold number of features;
maneuver the robotic vehicle to another location in response to determining that the number of extracted features exceeds the threshold number of features;
obtain one or more of a translation of the robotic vehicle and a rotation of the robotic vehicle using a movement sensor of the robotic vehicle;
determine whether an angular velocity of the robotic vehicle is less than an angular velocity threshold;
match one or more extracted first features with one or more second features extracted from a captured second image;
estimate an image sensor pose based on matched features and one of the translation of the robotic vehicle and the rotation of the robotic vehicle;
compute a first relative rotation matrix based on image information from the captured image and a second relative rotation matrix based on the one or more of the translation of the robotic vehicle and the rotation of the robotic vehicle obtained using the movement sensors of the robotic vehicle; and
determine whether the first relative rotation matrix is approximately equal to the second relative rotation matrix.

21. The robotic vehicle of claim 20, wherein the processor is further configured with processor-executable instructions to:
maneuver the robotic vehicle to another location;
capture and process a next image from the another location;
extract the second features from the next image; and
match the first features from the first image and the second features from the next image.

22. The robotic vehicle of claim 20, wherein the processor is further configured with processor-executable instructions to:
estimate a scale between a known physical size of an object in the first image and an estimated size of the object based on the first image.

23. The robotic vehicle of claim 22, wherein the processor is further configured with processor-executable instructions such that the estimated size of the object based on the first image is based on matches of the one or more extracted first features with the one or more second features.

24. The robotic vehicle of claim 20, wherein the processor is further configured with processor-executable instructions to:
determine that the image sensor initialization is successful in response to determining that the second image sensor pose is within the one or more thresholds.

25. A robotic vehicle, comprising:
an image sensor;
a processor coupled to the image sensor and configured with processor-executable instructions to:
capture a first image with the image sensor at a first location;
extract first features from the captured first image;
extract second features from a predefined image pyramid;
match one or more extracted first features with one or more extracted second features;
estimate a first image sensor pose based on matched first features and second features and known dimensions of the target image;
maneuver the robotic vehicle to a second location and capturing a second image from the second location;
extract third features from the captured second image;
maneuver the robotic vehicle to a third location and capturing a third image from the third location;
extract fourth features from the captured third image;
match one or more extracted third features with one or more extracted fourth features;
estimate a second image sensor pose based on the matched third and fourth features;
determine that the robotic vehicle has returned to the first location based on a translation of the robotic vehicle and a rotation of the robotic vehicle;
capture a fourth image with the image sensor of the robotic vehicle at the first location in response to determining that the robotic vehicle has returned to the first location;
extract fifth features from the fourth image;
match one or more extracted fifth features and with one or more extracted second features;
estimate a third image sensor pose based on the matched fifth features and second features; and
determine the coordinate system for the robotic vehicle based on the first image sensor pose, the second image sensor pose, and the third image sensor pose.

26. The robotic vehicle of claim 25, wherein the first image is an image of a target image, and wherein the second features are extracted from a predefined image pyramid.

27. The robotic vehicle of claim 25, wherein the processor is further configured with processor-executable instructions to:
perform a bundle adjustment using the first image sensor pose and the second image sensor pose.

28. The robotic vehicle of claim 27, wherein the processor is further configured with processor-executable instructions to:
perform the bundle adjustment using the matched first features and second features.

29. The robotic vehicle of claim 27, wherein the processor is further configured with processor-executable instructions to:
 perform the bundle adjustment using the matched third and fourth features.

30. The robotic vehicle of claim 27, wherein the processor is further configured with processor-executable instructions to:
 perform the bundle adjustment using the matched fifth features and second features.

* * * * *